United States Patent [19]

Rieck et al.

[11] Patent Number: 4,578,371

[45] Date of Patent: Mar. 25, 1986

[54] ALUMINOSILICATES HAVING A ZEOLITE STRUCTURE, AND PROCESS FOR THE MANUFACTURE THEREOF

[75] Inventors: Hans-Peter Rieck; Hans-Jürgen Kalz, both of Hofheim am Taunus, Fed. Rep. of Germany

[73] Assignee: Hoechst Aktiengesellschaft, Fed. Rep. of Germany

[21] Appl. No.: 630,941

[22] Filed: Jul. 16, 1984

Related U.S. Application Data

[63] Continuation-in-part of Ser. No. 551,268, Nov. 14, 1983, abandoned.

[30] Foreign Application Priority Data

Nov. 16, 1982 [DE] Fed. Rep. of Germany ....... 3242352
Jul. 15, 1983 [DE] Fed. Rep. of Germany ....... 3325514

[51] Int. Cl.$^4$ .................... C01B 33/28; B01J 29/06; B01J 27/14
[52] U.S. Cl. ...................... 502/71; 423/305; 423/306; 423/328; 423/329; 502/77; 502/214
[58] Field of Search ............................. 423/305–307, 423/328–330; 502/208, 214, 71

[56] References Cited

U.S. PATENT DOCUMENTS

| | | | |
|---|---|---|---|
| 3,355,246 | 11/1967 | Kuehl | 423/328 |
| 4,175,114 | 11/1979 | Plank et al. | 423/329 |
| 4,257,885 | 3/1981 | Grose et al. | 423/328 X |
| 4,356,338 | 10/1982 | Young | 585/407 |
| 4,420,418 | 12/1983 | Chu | 502/77 |
| 4,440,871 | 4/1984 | Lok et al. | 502/214 |

OTHER PUBLICATIONS

Flanigen et al., "Molecular Sieve Zeolite-I", 1971, pp. 76–101.

*Primary Examiner*—Edward J. Meros
*Attorney, Agent, or Firm*—Connolly and Hutz

[57] ABSTRACT

The invention provides a process for the manufacture of a crystalline, phosphorus-containing zeolite of the ZSM-5 type by mixing water, a silicon dioxide source, an alkali metal hydroxide and an aluminum compound, and reacting this mixture at a temperature of from 95° to 230° C. until the zeolite has crystallized, which comprises carrying out the reaction without addition of an organic compound but in the presence of aluminum phosphate. The zeolite obtained has the following molar ratios:

$SiO_2:Al_2O_3$ from 15 to 200,
$M_2O:SiO_2$ from $10^{-6}$ to 1 and
$H_2O:SiO_2$ from 0 to 40

(M being an alkali metal). It is free from organic compounds and contains phosphate in a molar ratio of $P_2O_5:SiO_2$ of from $10^{-5}$ to 0.1. X-ray diffraction patterns are indicated.

2 Claims, 1 Drawing Figure

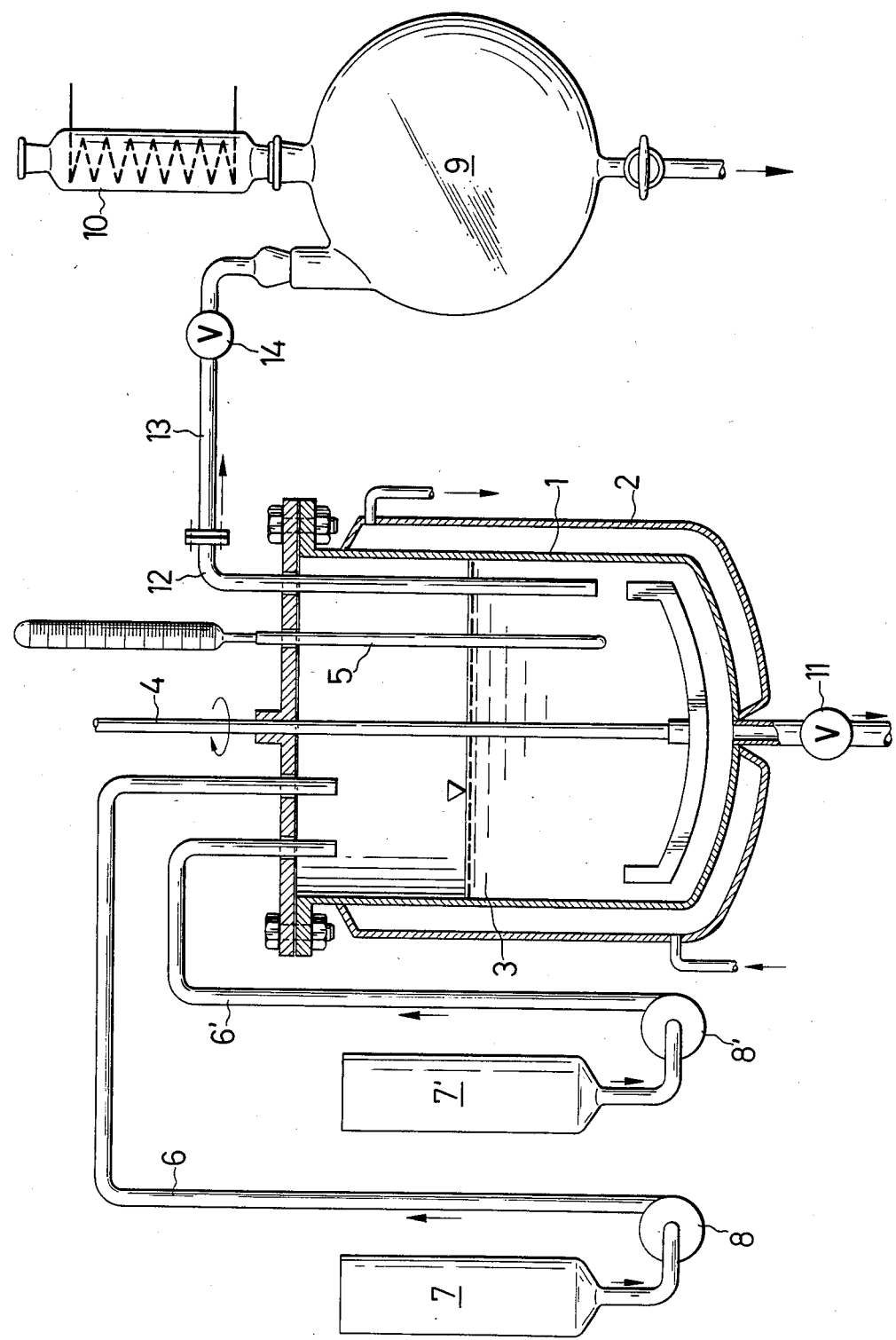

ALUMINOSILICATES HAVING A ZEOLITE STRUCTURE, AND PROCESS FOR THE MANUFACTURE THEREOF

This is a continuation-in-part-application of application Ser. No. 551,268 filed Nov. 14, 1983, now abandoned.

The invention provides synthetic crystalline, phosphorus-containing zeolites rich in silicate, corresponding to the ZSM-5 type, and a process for the manufacture thereof.

Various zeolites have gained great technological importance because they can be applied as ion exchangers, molecular sieves or catalysts. Recently, zeolites of the pentasil type, to which the ZSM-5 zeolites, too, belong, are of increasing interest because they are very efficient in many alkylations and isomerizations and catalyze the conversion of methanol to olefins, aromatic substances and (to a lesser extent) saturated hydrocarbons.

The ZSM-5 zeolite is normally manufactured in the presence of cations containing organic nitrogen, especially tetraalkylammonium cations (U.S. Pat. No. 3,702,886). Different other organic compounds such as alkylamines, alkylenediamines, alcohols or ketones have furthermore been used for those purpose. According to U.S. Pat. No. 4,175,114, a zeolite of the ZSM-5 type can be formed also in the presence of seed crystals of the zeolite, optionally together with ammonium hydroxide and/or alcohols. A similar synthesis with the aid of alcohols is described in German Offenlegungsschrift No. 2,643,929. Ammonia may be used as basic component in the absence of seed crystals and alcohol (European Patent Application No. 30,811). It is furthermore known that on manufacture of some special zeolite types, the product composition and the product properties can be modified by addition of phosphates or phosphoric acid to the reaction mixture (D. W. Breck, Zeolite Molecular Sieves, 1974, pp. 322–331; German Offenlegungsschrift No. 3,137,729).

In such zeolites, the phosphorus is probably present in the form of phosphate.

However, these literature references contain no indications on the formation of zeolite ZSM-5 in the presence of phosphate. After-treatment of a zeolite with organic or inorganic phosphorus compounds may cause alterations of the catalytic properties (German Offenlegungsschrift No. 2,542,230).

The results of some of these processes can be reproduced but with difficulty. Often, a perfect crystalline ZSM-5 type zeolite is not obtained because other aluminosilicates such as mordenite are formed instead of or in addition to zeolite ZSM-5, or amorphous products occur as impurities. It is disadvantageous to use organic compounds for synthesis because they remain in the lattice and must be decomposed by calcination before applying the zeolite as catalyst. Thus, they are lost for any reuse.

It is therefore the object of the invention to provide a zeolite of the ZSM-5 type which can be manufactured in pure form in a simple and easily reproducible manner without addition of an organic compound.

There has been found a zeolite of the ZSM-5 type having a molar ratio of
$SiO_2:Al_2O_3$ of from 15 to 200,
$M_2O:SiO_2$ of from $10^{-6}$ to 1 and
$H_2O:SiO_2$ of from 0 to 40

M being an alkali metal, which is free from organic compounds, contains phosphate in a molar ratio $P_2O_5:SiO_2$ of from $10^{-5}$ to 0.1, and has X-ray reflections at least at an interplanar spacing of $11.5\pm0.5$; $10.0\pm0.5$; $3,89\pm0.05$; $3.84\pm0.05$; $3.76\pm0.05$ and $3.67\pm0.05$ ($\times 10^{-8}$ cm).

The zeolite of the invention differs from the zeolites of German Offenlegungsschrift No. 2,704,039 by its phosphorus content and the presence of an infrared band in the range of 3,600 to 3,100 cm$^{-1}$. Moreover, the X-ray diffraction patterns partially show pronounced differences of intensity. The main difference is in the ratio of intensity of the line at the d-value of 11.2 to that of 10.0, which ratio is from 0.15 to 0.625 in the case of the zeolite of German Offenlegungsschrift No. 2,704,039. In the case of the zeolite of the invention it is on principle greater than 1, as far as complete crystallization and absence of impurities are ensured. The line at the d-value of 11.2 is therefore more pronounced than that at the d-value of 10 in all cases. Generally, the ratio is from 1.3 to 1.9.

The molar ratio $SiO_2:Al_2O_3$ of the zeolite according to the invention is preferably from 16 to 100, especially 18 to 40, and that of $M_2O:SiO_2$ is preferably from $10^{-6}$ to 0.3, especially $10^{-4}$ to 0.1. As alkali metal M, sodium, lithium or potassium are generally used, preferably sodium. The molar ratio $P_2O_5:SiO_2$ is preferably from $10^{-4}$ to 0.1, especially $10^{-4}$ to 0.05.

The phosphate may be contained in the aluminum silicate in different forms. For example, it may be enclosed in the cavities of the zeolite or incorporated into the aluminosilicate lattice. The X-ray diffraction patterns of Tables 1 to 3 (see Examples 2 and 3) prove that the structure of the zeolite in accordance with the invention is very similar to that of the known ZSM-5. However, the aluminum silicate of the invention is different from the ZSM-5 zeolite obtained according to known processes in that it is free from organic compounds and ammonium ions, but contains phosphorus. In the thermogravimetric examination of the novel zeolites a pronounced decrease of weight in the temperature range of from 350° to 450° C. is not observed as in the case of zeolites manufactured with the aid of tetraalkylammonium compounds. While in the case of the latter ones the intensity of the X-ray lines at d-values of 11 and 10 is pronouncedly increased by heating (see German Offenlegungsschrift No. 3,137,729), there are only slight alterations in the zeolites of the invention. Table 3 shows the X-ray diffraction pattern of the zeolite of Table 2 after heating for 4 hours at 550° C.

The invention provides furthermore a process for the manufacture of a crystalline, phosphorus-containing zeolite of the ZSM-5 type by mixing water, a silicon dioxide source, an alkali metal hydroxide and an aluminum compound, and reacting this mixture at a temperature of from 95° to 230° C. until the zeolite has crystallized, which comprises carrying out the reaction in the presence of aluminum phosphate. The process of the invention is carried out without addition of an organic compound and in the absence of ammonium ions.

The molar ratio of the reactants $SiO_2:Al_2O_3$ is generally from 15 to 200, preferably 20 to 200, especially 20 to 100. The molar ratio $M_2O:SiO_2$ is generally from $10^{-3}$ to 1, preferably 0.01 to 1, especially 0.1 to 0.5. The molar ratio $P_2O_5:SiO_2$ is generally from $10^{-4}$ to 0.5, preferably $10^{-3}$ to 0.2, especially $10^{-2}$ to 0.1. The molar ratio $H_2O:SiO_2$ is generally above 10, preferably from 20 to 100, especially 20 to 50. As $SiO_2$ source active silicic acid, for example pyrogenic silicic acid or silicic acid sol, may be used. Generally preferred, however, is cheap water glass. The aluminum content of these industrial grade products is in some cases sufficient for the zeolite synthesis. The molar ratio $SiO_2:Al_2O_3$ may be reduced by adding an aluminum compound such as aluminum hydroxide (freshly precipitated or in the form of hydrargillite) or aluminum sulfate. Alkali metal hydroxide may be used in free form, in form of the alkali metal oxide portion of the water glass added, or in form of alkali metal aluminate. Alternatively, other salts of alkaline reaction, such as alkali metal carbonate, may be added.

Preferably, the pH of the aqueous solution or suspension is in the range of from 8 to 12, especially 9 to 11.7. An acid, for example sulfuric or phosphoric acid, may be added to the reaction batch in order to adjust the pH. In the case of a low molar ratio $OH^-/SiO_2$, the required reaction time is reduced, but there is the risk of amorphous portions occurring.

The aluminum phosphate employed in accordance with the invention is preferably used in solid form; soluble aluminum phosphates such as $Al(H_2PO_4)_3$ or $AlH_3(PO_4)_2 \cdot 3H_2O$ may be added; preferably, however, scarcely soluble $AlPO_4$. This compound may be amorphous or may have a quartz, tridymite or cristobalite structure. Especially an industrial grade aluminum phosphate $AlPO_4$ having a quartz structure (for example Riedel de Haen Product 04207) is suitable for the reaction. Alternatively, it is possible to form the aluminum phosphate in the reaction vessel before the zeolite reaction from an aluminum component and a phosphorus component, advantageously at a pH of from 4 to 7.5. The aluminum phosphate may furthermore be formed in the reaction mixture. In the case where scarcely soluble aluminum phosphate is used for the manufacture of the zeolite of the ZSM-5 type, it is required that the solids are homogeneously distributed in the reaction mixture by stirring thoroughly, because otherwise undesirable by-products such as mordenite are formed. Generally, thorough agitation during the synthesis is advantageous.

The molar ratio $P_2O_5/Al_2O_3$ in the reaction mixture is preferably from 0.1 to 200, preferably 0.5 to 10, especially 0.9 to 5.

The aluminum phosphate may be contained in the reaction mixture as single aluminum component, on the other hand it is possible to add further aluminum compounds. After crystallization of the aluminosilicate it is generally impossible to detect the solid aluminum phosphate added by X-ray radiation.

The process of the invention is preferably carried out at a reaction temperature of from 150° to 220° C., especially 180° to 210° C. Seed crystals are not required; their presence, however, reduces the reaction time. An improved purity degree of the products can furthermore be attained by seed crystals, even if the reactants are insufficiently intermixed. The reaction is carried out hydrothermally under the individual pressure of the liquid phase. The reaction time is set in such a manner that the zeolite is completely crystallized, for which purpose a few hours are sometimes sufficient, especially at a temperature of above 180° C. On the other hand, a reaction time of several days may be required. The reaction time necessary depends on the individual reaction conditions of each case. It can be determined by X-ray diffraction patterns of samples taken after different times. Thus, aluminosilicates having an X-ray pattern characteristic for ZSM-5 type zeolites can be manufactured.

In addition to aluminum, other elements, especially boron, indium, gallium, may be incorporated during the synthesis in small amounts into the crystal lattice formed. Metals of the 1st and 2nd main group or 3rd to 8th subgroup of the Periodic Table may likewise be incorporated during the reaction or later into the zeolite and may amount to up to 25 weight %. A small portion of these elements does not alter the crystal structure of the zeolite but to an insignificant extent only. Subsequent incorporation of these elements may be performed by impregnating the zeolite with an aqueous solution in which at least one metal compound is dissolved.

The zeolites manufactured according to the process of the invention have the properties of molecular sieves and can therefore be applied for adsorptions. They are furthermore suitable as catalysts, for example for cracking and hydrocracking processes, isomerization reactions, alkylations and the conversion of methanol.

For application as catalysts, the aluminosilicates obtained are generally not used but after having been activated by exchange of the sodium ions by other cations as cited above, especially hydrogen ions. This can be achieved by means of known ion exchange reactions. The phosphorus content may thus be reduced, especially when using mineral acids. Calcination of the zeolite before the ion exchange is possible, although not required. It is carried out advantageously at a temperature above 400° C.

A special embodiment of the process according to the invention consists in carrying out the reaction continuously or semicontinuously in a stirred vessel, the time of addition of the individual components being of from 1 to 100% of the reaction time. The following statements apply to this variant:

In said stirred vessel, the ratio between the height and the diameter should preferably be smaller than 2 so that the mixing in the vessel is as thorough as possible. The reaction temperature for the crystallization of the aluminum silicate is preferably 120° to 220° C., in particular 150° to 200° C. Temperatures of more than 100° C. are almost always applied, so that an autoclave is required, since a rather high pressure builds up above the aqueous reaction mixture. An additional increase in pressure by adding an inert gas is not advantageous. The temperature during the addition of the reaction components should also be within the indicated temperature range. This is reached in particularly easy manner, if the added substances have been pre-heated.

Since the pressure in the stirred tank is in general greater than 1 bar, a pump is required for metering in the reaction components. One single pump may be sufficient for this purpose. However, it is also possible to add the indicated components separately so that 2 or even more pumps have to be used at different inlet points of the autoclave. The acid reaction components (aluminum sulfate, phosphoric acid) and the basic reaction components (sodium aluminate, sodium silicate, sodium hydroxide solution) are preferably metered in separately, in order to avoid a premature gel formation.

Alternatively, the starting products may be added successively, a simultaneous addition being, however, preferred. A time of addition for each component amounting to 10 to 100%, in particular to 20 to 80%, of the reaction time (average dwelling time) is preferred.

The contents in the stirred vessel increase, unless some product is withdrawn simultaneously while adding the starting products. The addition has to be stopped at the latest at the point at which the maximum filling level has been reached. In the case of a very rapid addition, stirring in the reaction vessel has to be continued, in order to achieve a satisfactory formation of zeolites by after-crystallization. Subsequently, the product is removed from the autoclave still hot. It may, however, be advantageous to carry out this after-crystallization step in a second vessel likewise equipped with stirring means. The time of the after-crystallization should correspond to at most the 99-fold, preferably to at most the 20-fold and in particular (in the case of high temperatures) only to the 9-fold or even only to the 4-fold time of addition.

Advantageously the first of the reaction vessels used, if several vessels are used, or the sole vessel used are never completely emptied, but some product mixture consisting of the crystallized aluminum silicate and the mother liquor, including the unreacted starting products, should be always contained therein. Thus a high portion of zeolite crystals remains in the autoclave, which promotes the further formation of zeolite.

The weight ratio between the zeolite crystals and dissolved $SiO_2$ in the reaction mixture (after a steady state has been reached) should be greater than 0.05, preferably greater than 0.1 and in particular greater than 0.2. Constant values frequently greater than 0.5 are obtained in the case of continuous operation. Periodically greater or periodically smaller values are obtained in semicontinuous operation.

It may also happen in the case of continuous operation with ideal mixing that a bigger quantity of crystalline zeolite than of dissolved silicate is present in the stirred vessel as well as in the discharged product.

The product can be discharged from the autoclave still under pressure via an adequate bottom discharge valve. If only a partial evacuation is intended, this is achieved advantageously via a rising pipe which immerges into the reaction mixture and is closed by a valve. The maximum quantity of product to be removed is defined by the length of the rising pipe.

The process according to this embodiment of the invention is advantageously run in a continuous manner. This requires a continuous feed of the starting products as well as a continuous discharge of the reaction products. For example, a rising tube may be used for this purpose. To monitor the reaction vessel, it may be necessary to control the filling level by a filling level indicator or to weigh the apparatus.

For economical reasons the reaction time is in general calculated so that at least 10% of the silicate added have crystallized in the form of zeolites at the end of the reaction. Shorter reaction times are required in the case of higher reaction temperatures. Temperatures of more than 180° C. require sometimes reaction times of less than 1 hour. It may also happen, however, that reaction times of several days are required. The reaction times required, in dependence on the reaction conditions applied, can be determined by evaluating the X-ray diffraction patterns of individual samples taken one after another. Aluminum silicates can be prepared according to the invention which exclusively exhibit the X-ray diffraction pattern characteristic for ZSM-5-like zeolites.

The ratio between the crystalline zeolite and dissolved silicate is principally determined by the average dwelling time as well as by the composition (in particular the pH-value) of the reaction mixture. An increase in the average dwelling time results in a higher zeolite portion, but may also favor the formation of by-products. In the case of rather short dwelling times it may be advisable for economical reasons, to be satisfied with a rather small portion of zeolite.

The following examples illustrate the invention.

EXAMPLE 1 (COMPARATIVE EXAMPLE)

The reaction mixture is composed as follows (molar composition):

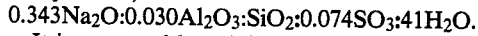
$0.343Na_2O:0.030Al_2O_3:SiO_2:0.074SO_3:41H_2O$.

It is prepared by adding 222.56 g of industrial grade water glass (27% $SiO_2$, 8.43% $Na_2O$, 0.24% $Al_2O_3$) to 594.4 g of water. Subsequently, 3.23 g of NaOH and 16.50 g of $Al_2(SO_4)_3.18H_2O$ are added with stirring. The reaction mixture is stirred for 18 hours at 180° C. under autogenous pressure in a stainless steel autoclave. After cooling, the reaction mixture is filtered, washed with water, and dried for 4.5 hours at 120° C. The product has the X-ray diffraction pattern of Na mordenite; reflections which are characteristic for ZSM-5-like zeolites are not observed.

EXAMPLE 2

The reaction mixture has the following molar composition:

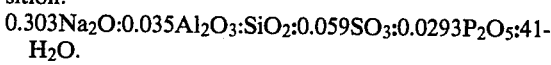
$0.303Na_2O:0.035Al_2O_3:SiO_2:0.059SO_3:0.0293P_2O_5:41H_2O$.

It is prepared as indicated in Example 1. Subsequently, 8.0 g of industrial grade aluminum phosphate (Riedel-de-Haen 04207, 38% $Al_2O_3$, 52% $P_2O_5$, 10% weight loss on heating to 600° C.) having quartz modification are added. For a better comparison with Example 1, 6 g of $H_2SO_4$ (96% strength) are furthermore added. If 10 g of the reaction mixture are diluted with 250 ml of water, the pH is at 10.7. The reaction mixture is then worked up as indicated in Example 1. The product has an X-ray diffraction pattern characteristic for ZSM-5 type zeolites (see Table 1: the first column indicates the interplanar spacing and the second column the relative intensity; strongest peak=100).

EXAMPLE 3

The reaction mixture has the following molar composition:

$0.303Na_2O:0.0425Al_2O_3:SiO_2:0.097P_2O_5:41H_2O$.

It is prepared as described in Example 1. Subsequently, 10.0 g of industrial grade aluminum phosphate ($AlPO_4$) and 13.9 g of 85% phosphoric acid are added. The reaction mixture is stirred for 18 hours at 190° C. under autogenous pressure in a stainless steel autoclave. After cooling, the reaction mixture is filtered, washed with water and dried at 120° C. The product is composed as follows: 77.9% $SiO_2$, 6,8% $Al_2O_3$, 5.4% $Na_2O$, 3.2% $P_2O_5$. From the difference to give 100% a water content of 6.7% is calculated. This corresponds to a molar composition of $19.4SiO_2:Al_2O_3:1,3Na_2O:0.3P_2O_5:5.6H_2O$.

The aluminosilicate has the X-ray diffraction pattern of Table 2. By extraction with 1N $NH_4Cl$ solution at 100° C. and subsequent calcination with $Na_2O$ content can be reduced to 0.16%. When extracting the 1N hydrochloric acid, a $Na_2O$ content of 0.09% is obtained. When heating the crude product obtained as above after drying at 120° C. for 4 hours at 550° C., it has the X-ray diffraction pattern of Table 3.

EXAMPLE 4

The reaction mixture has the following molar composition:
$0.303Na_2O:0.0239Al_2O_3:SiO_2:0.079P_2O_5:41H_2O$.
2.226 kg of industrial grade water glass are diluted with 5.94 kg of water. Subsequently, 50 g of industrial grade aluminum phosphate ($AlPO_4$) and 139 g of 85% phosphoric acid are added. This reaction mixture is stirred slowly at 180° C. under autogenous pressure in a 10 liter stainless steel autoclave which has never been used before. Seed crystals were neither present in the reaction vessel nor added. After 18 hours, the X-ray diffraction pattern showed magnitude in addition to the main product of a ZSM-5-like aluminosilicate. After further 18 hours at 180° C., mordenite and tridymite can be detected in small amounts in addition to the ZSM-5 type main product.

EXAMPLE 5

(a) Test Apparatus

The apparatus used is illustrated in the accompanying figure. The stirred autoclave (1) has a net volume of about 2 liters, an inner diameter of 14 cm and a maximal inner height of 17.5 cm. It is heated by means of oil circulating in a heating jacket (2). The reaction mixture (3) formed in (1) is thoroughly mixed by a stirrer (4). The inner temperature is checked by a thermometer in a thermometer sleeve (5). The oil temperature is regulated, based on the measured temperatures, in order to reach a constant temperature of (3). The starting products are placed in the supply vessels (7) and (7') from which they are transported through the pipes (6) and (6') to the stirred autoclave with the aid of the pumps (8) and (8'). (7) contains the water glass diluted with some water, (7') contains the residual starting products. The time of addition is regulated by adjusting the suction and the frequency of the pumps. The feeding pipes are closed by valves (not shown). The stirred autoclave is further equipped with a manometer (not shown) and a safety valve (not shown).

At the end of the test, the reaction product can be discharged through the bottom discharge valve (11). If only a partial evacuation of the autoclave is intended, the product is discharged via the rising pipe (12) and the pipe (13). The pipe (13) is equipped with a valve (14). By appropriately regulating the valve (14), the product is discharged portionwise or continuously. The level of (3) corresponds to the inner height of the autoclave below the rising pipe and at most to the inner height of the autoclave. The product is transported via pipe (13) to a 2 l two-necked flask (9) connected with a reflux condenser (10) for condensing the steam. The flask (9) is emptied portionwise or continuously. The product is filtered, washed and worked up in the usual manner.

(b) Test performance (semicontinuously)

The stirred autoclave (1) is charged with 445 g of sodium water glass (27% $SiO_2$, 8.43% $Na_2O$, 0.24% $Al_2O_3$), 1,189 g of water, 10 g of aluminum phosphate (38% $Al_2O_3$, 52% $P_2O_5$, 10% weight loss on heating to 600° C.), 27.8 g of 85% phosphoric acid and 20 g of ZSM-5-like zeolite (from a corresponding preceding test).

The reaction mixture has the following molar composition: $0.303Na_2O:0.024Al_2O_3:SiO_2:0.079P_2O_5:41H_2O$.

The added zeolite is not taken into account in the above composition.

The reaction mixture is stirred at 190° C. for 5.5 hours. Subsequently, about 1,400 ml of product mixture are discharged via the rising pipe (12) and are filtered. The separated solids are dried. 95 g of crystalline product are obtained. The X-ray diffraction pattern has the characteristics of a ZSM-5-like zeolite.

The above-specified sum of the starting products (without the zeolite) are anew metered in via both pumps to the residual quantity of product mixture in the stirred autoclave at an inner temperature of 160°–164° C. within 40 minutes. Subsequently, the pipings are rinsed with a total amount of 150 ml of water. The reaction mixture is stirred for two hours at 200° C. Subsequently, about 1500 ml of product mixture are discharged within 10 minutes via the rising pipe. 72 g of ZMS-15-like zeolite are obtained therefrom. The above-specified sum of the starting products is anew pumped to the remaining product mixture within 45 minutes at 185° C. The autoclave is stirred at 170° C. for 16.5 hours. 1,150 ml of product mixture are discharged. 96 g of zeolite are obtained therefrom. The above-specified sum of the starting products is anew pumped to the remaining product mixture. Then the mixture is stirred for 4.5 hours at 200° C. About 1,500 ml of product mixture are discharged via the rising pipe. 82 g of zeolite are obtained therefrom on drying at 120° C. The autoclave is cooled and completely emptied. 52 g of zeolite are obtained from the remaining product mixture (about 420 ml). The crystallinity of all zeolite samples is very good. The X-ray diffraction pattern of the last sample is shown in Table 4.

EXAMPLE 6

The reaction takes place while adding the starting products and simultaneously discharging the products which have been subjected to after-crystallization.

The test apparatus corresponds to that of Example 5. The stirred autoclave is charged with the starting products specified in Example 5. The quantity of added zeolite is increased to 50 g. After heating the stirred vessel to 200° C. and after a 2 hours' stirring (to effect the aftercrystallization) at constant temperature an equal reaction mixture as that added in the beginning (without the zeolite) is metered in by means of the pumps within one hour, while about 1,550 ml of reaction mixture are discharged via the rising pipe. The filling level in the reaction mixture thus remains nearly constant. The discharged reaction mixture is cooled and filtered and the filter cake is dried. 117 g of a ZSM-5-like zeolite are obtained, the X-ray diffraction pattern of which has the reflections which are characteristic for zeolites of the ZSM-5-type.

The reaction mixture in the autoclave is stirred successively for one hour at 200° C. and for 17 hours (stirred overnight) at 75° C. The temperature is increased to 200° C. Subsequently, the above mixture of starting products (without the zeolite) is added by pumping within 2 hours, while about 2 liters of product mixture are discharged. The product mixture is filtered, dried and examined by roentgenography. The product is distinguished by the X-ray reflections which are characteristic for a ZSM-5-like zeolite. In addition very weak reflections of a mordenite-like zeolite are observed. The product mixture is stirred in the autoclave for a further 2 hours and discharged via the rising pipe.

TABLE 1

| d ($10^{-8}$ cm) | ($I/I_o$) |
|---|---|
| 11.2 | 70 |
| 10.1 | 33 |
| 10.0 | 33 |
| 9.83 | 18 |
| 9.03 | 5 |
| 7.47 | 5 |
| 7.11 | 3 |
| 6.73 | 9 |
| 6.56 | 4 |
| 6.39 | 17 |
| 6.03 | 16 |
| 5.72 | 14 |
| 5.59 | 15 |
| 5.39 | 4 |
| 5.16 | 3 |
| 5.04 | 5 |
| 5.00 | 8 |
| 4.87 | 2 |
| 4.62 | 8 |
| 4.52 | 3 |
| 4.37 | 13 |
| 4.28 | 17 |
| 4.10 | 9 |
| 4.02 | 10 |
| 4.00 | 6 |
| 3.88 | 100 |
| 3.83 | 75 |
| 3.76 | 42 |
| 3.73 | 51 |
| 3.66 | 34 |
| 3.60 | 4 |
| 3.49 | 9 |
| 3.45 | 15 |
| 3.38 | 27 |
| 3.32 | 13 |
| 3.25 | 5 |
| 3.15 | 5 |
| 3.06 | 17 |
| 3.00 | 17 |
| 2.99 | 17 |
| 2.95 | 8 |
| 2.88 | 5 |
| 2.84 | 3 |
| 2.74 | 7 |
| 2.69 | 3 |
| 2.61 | 5 |
| 2.52 | 5 |

TABLE 2

| d ($10^{-8}$ cm) | ($I/I_o$) |
|---|---|
| 11.3 | 64 |
| 10.0 | 36 |
| 9.83 | 16 |
| 9.07 | 3 |
| 7.47 | 5 |
| 7.11 | 2 |
| 6.73 | 8 |
| 6.39 | 12 |
| 6.03 | 14 |
| 5.74 | 12 |
| 5.61 | 13 |
| 5.41 | 3 |
| 5.16 | 2 |
| 5.01 | 8 |
| 4.63 | 6 |
| 4.39 | 10 |
| 4.28 | 12 |
| 4.10 | 4 |
| 4.03 | 8 |
| 3.87 | 100 |
| 3.83 | 77 |
| 3.77 | 41 |
| 3.74 | 53 |
| 3.67 | 31 |
| 3.61 | 7 |
| 3.50 | 8 |
| 3.45 | 12 |
| 3.38 | 11 |

TABLE 2-continued

| d ($10^{-8}$ cm) | ($I/I_o$) |
|---|---|
| 3.37 | 11 |
| 3.32 | 11 |
| 3.26 | 5 |
| 3.20 | 3 |
| 3.15 | 3 |
| 3.06 | 9 |
| 3.00 | 14 |
| 2.99 | 15 |
| 2.95 | 5 |
| 2.88 | 4 |
| 2.80 | 4 |
| 2.74 | 6 |
| 2.61 | 4 |
| 2.25 | 4 |
| 2.50 | 5 |
| 2.42 | 3 |
| 2.40 | 4 |

TABLE 3

| d ($10^{-8}$ cm) | ($I/I_o$) |
|---|---|
| 11.3 | 67 |
| 10.22 | 41 |
| 10.15 | 39 |
| 9.94 | 16 |
| 9.12 | 3 |
| 8.15 | 2 |
| 7.53 | 4 |
| 7.14 | 3 |
| 6.78 | 8 |
| 6.44 | 14 |
| 6.05 | 17 |
| 5.75 | 12 |
| 5.64 | 14 |
| 5.42 | 4 |
| 5.19 | 3 |
| 5.07 | 5 |
| 5.02 | 7 |
| 4.66 | 6 |
| 4.40 | 12 |
| 4.29 | 16 |
| 4.11 | 5 |
| 4.04 | 8 |
| 3.88 | 100 |
| 3.85 | 75 |
| 3.78 | 43 |
| 3.75 | 54 |
| 3.67 | 31 |
| 3.62 | 5 |
| 3.51 | 9 |
| 3.47 | 11 |
| 3.39 | 10 |
| 3.33 | 12 |
| 3.27 | 5 |
| 3.20 | 2 |
| 3.16 | 2 |
| 3.07 | 13 |
| 3.00 | 14 |
| 2.99 | 14 |
| 2.96 | 6 |
| 2.88 | 3 |
| 2.75 | 6 |
| 2.70 | 2 |
| 2.62 | 4 |
| 2.53 | 3 |
| 2.50 | 5 |
| 2.43 | 3 |
| 2.40 | 3 |

TABLE 4

| Interplanar spacing d ($10^{-8}$ cm) | Relative Intensity ($I/I_o$) |
|---|---|
| 11.3 | 75 |
| 10.2 | 42 |
| 9.88 | 18 |
| 9.07 | 3 |
| 7.53 | 5 |

TABLE 4-continued

| Interplanar spacing d ($10^{-8}$ cm) | Relative Intensity ($I/I_o$) |
|---|---|
| 7.17 | 3 |
| 6.78 | 8 |
| 6.44 | 16 |
| 6.05 | 20 |
| 5.77 | 14 |
| 5.62 | 14 |
| 5.42 | 5 |
| 5.17 | 3 |
| 5.07 | 7 |
| 5.01 | 9 |
| 4.90 | 1 |
| 4.65 | 7 |
| 4.48 | 2 |
| 4.40 | 12 |
| 4.29 | 16 |
| 4.12 | 4 |
| 3.95 | 8 |
| 3.88 | 100 |
| 3.84 | 76 |
| 3.78 | 39 |
| 3.75 | 53 |
| 3.68 | 35 |
| 3.62 | 5 |
| 3.57 | 2 |
| 3.51 | 8 |
| 3.47 | 12 |
| 3.42 | 5 |
| 3.39 | 6 |
| 3.38 | 9 |
| 3.33 | 13 |
| 3.27 | 7 |
| 3.20 | 3 |
| 3.16 | 5 |
| 3.07 | 15 |
| 3.01 | 15 |
| 2.99 | 15 |
| 2.96 | 8 |
| 2.88 | 5 |
| 2.85 | 2 |
| 2.80 | 2 |
| 2.75 | 6 |
| 2.69 | 3 |
| 2.67 | 2 |
| 2.65 | 1 |
| 2.63 | 6 |
| 2.60 | 4 |
| 2.58 | 3 |
| 2.53 | 5 |
| 2.50 | 7 |
| 2.46 | 2 |
| 2.43 | 4 |
| 2.41 | 5 |
| 2.37 | 1 |
| 2.34 | 3 |

What is claimed is:

1. Process for the manufacture of a crystalline, phosphorus-containing zeolite having a ZSM-5 type crystal lattice structure by mixing water, a silicon dioxide source, an alkali metal hydroxide and an aluminum compound, and reacting this mixture at a temperature of from 95° to 230° C. until the zeolite has crystallized, which comprises adding solid $AlPO_4$ to the mixture of reactants and carrying out the reaction without addition of an organic compound, the reaction mixture having a composition expressed in terms of mole ratio of oxides of $SiO_2:Al_2O_3$ from 15 to 200, $P_2O_5:SiO_2$ from $10^{-3}$ to 0.2 and $P_2O_5:Al_2O_3$ from 0.1 to 200.

2. Process according to claim 1, which comprises carrying out the reaction continuously or semicontinuously in a stirred vessel, the time of addition of the individual components being of from 1 to 100% of the reaction time.

* * * * *